United States Patent [19]
Kallel

[11] 3,870,275
[45] Mar. 11, 1975

[54] VALVE CONSTRUCTION
[75] Inventor: Allen Kallel, Santa Ana, Calif.
[73] Assignee: Wemac Company, Santa Ana, Calif.
[22] Filed: May 24, 1973
[21] Appl. No.: 363,656

[52] U.S. Cl................... 251/252, 251/138, 251/215
[51] Int. Cl............................................ F16k 31/10
[58] Field of Search ............. 251/140, 138, 58, 252, 251/253, 139, 215

[56] References Cited
UNITED STATES PATENTS
| | | | |
|---|---|---|---|
| 320,105 | 6/1885 | White ............................ | 251/138 X |
| 601,351 | 3/1898 | Lewitzki ........................ | 251/139 X |

*Primary Examiner*—Arnold Rosenthal
*Attorney, Agent, or Firm*—George F. Smyth

[57] ABSTRACT

A valve construction in which an axially movable valve member is engagable by a valve seat when the valve member is in a closed position. Ramp means are positioned to support the valve member with the ramp means including a ramp surface having stepped portions positioned at different levels to support the valve member at different levels with respect to the valve seat. Means are provided to move the valve member axially with respect to the valve seat and means are provided to rotate the valve member as the valve member is moved axially. The rotational movement of the valve member corresponds to the distance between the stepped portions of the ramp surface. Thus, as the valve member is moved axially, it is rotated through a distance sufficient to position the valve member at a different level on the ramp surface with respect to the valve seat.

11 Claims, 5 Drawing Figures

PATENTED MAR 11 1975

VALVE CONSTRUCTION

BACKGROUND OF THE INVENTION

In providing ventilation for passengers, airplanes are commonly equipped with a ventilation system which provides an individual ventilation outlet for each passenger. Generally, such outlets are within the convenient reach of the passenger such that the outlet may be operated manually by the passenger to control air flow.

Presently, airplanes are being made which have a larger interior with the interior being several seats wide and having a relatively high ceiling. In such airplanes, the ventilation outlets for the individual passengers are in the ceiling and are out of reach of the passengers. Thus, the ventilation outlets must now be provided with a valve construction which may be controlled remotely by the passengers.

The present invention satisfies a need for a valve construction which has particular suitability for usage in an airplane ventilation system where the valve is controlled remotely by the passenger. The present valve construction operates satisfactorily over a range of air pressures within the ventilation system to open the valve through movement of a valve member away from a valve seat with positive positioning of the valve member on a ramp means to support the valve member with respect to the valve seat when the valve is in an open position.

SUMMARY OF THE INVENTION

In the present valve construction, an axially movable valve member is engagable with a valve seat with the valve member in a closed position. Ramp means are provided to support the valve member with respect to the valve seat such that the valve is closed or opened. The ramp means includes a ramp surface having stepped portions which are positioned at different levels to support the valve member at different levels with respect to the valve seat.

Means are provided to move the valve member axially with respect to the valve seat and means are also provided to rotate the valve member through an incremental arc as the valve member is moved axially. The incremental arc of rotational movement corresponds to the distance between stepped portions on the ramp surface. Thus, the valve member may be moved from one position to another with respect to the valve seat by rotating the valve member to a new position with respect to the stepped surface of the ramp means. On rotational movement of the valve member to a new position with respect to the ramp surface, the position of the valve member with respect to the valve seat is altered such that the opening through the valve is also altered.

During axial movement of the valve member, the valve member may be rotated during its axial movement away from the ramp means and may also be rotated during its axial movement toward the ramp means. Reciprocative means may be utilized in providing axial movement of the valve member so as to first move the valve member away from the valve seat and ramp means and to then move the valve member toward the valve seat and ramp means.

In providing rotational movement of the valve member, a guide pin may be carried by the valve member with the guide pin being engagable with a guide slot. The guide slot may be shaped to provide rotational movement of the valve member in response to axial movement of the valve member and guide pin. Thus, as the valve member is moved axially by the reciprocative means, the valve member is rotated through contact of the guide pin with the guide slot.

The guide slot which may be used to provide rotation of the valve member may include a first fixed circular series of teeth and a second fixed circular series of teeth which are positioned co-axially with the first series of teeth. The first and second series of teeth may be spaced apart axially with the teeth of each series directed toward the teeth of the other series and with the teeth of each series being staggered relative to the teeth of the other series. By positioning the first and second series of teeth in this manner, the spacing between the two series of teeth provides a guide slot for the guide pin in providing rotation of the valve member.

During movement of the guide pin within the space between the first and second series of teeth, the guide pin may cam against the teeth of one of the series of teeth on axial movement of the pin in a first direction to provide rotation of the valve member. Then, on movement of the guide pin in the opposite direction, it may cam against the teeth of the other series of teeth to provide further rotational movement of the valve member.

The valve member may include a follower arm which projects radially to contact the ramp surface in positioning the valve member at different levels with respect to the valve seat. Then, as the valve member is rotated, the follower arm is moved to a new position relative to the stepped portions of the ramp surface.

Yielding means may be interposed between the reciprocative means and the valve member. Thus, relative movement may be provided between the reciprocative means and the valve member as the follower arm contacts the ramp surface. The extent of the relative movement may be determined by the level of the stepped portion which is contacted by the follower arm.

Preferably, the ramp means has an annular configuration that extends circumferentially about the axis of the valve member. The stepped portions of the ramp surface are preferably positioned transversely to the axial movement of the valve member. Sliding movement of the follower arm relative to a stepped portion is, thus, facilitated during rotation of the valve member as the reciprocative means moves in the direction of the ramp means with relative movement being permitted between the reciprocative means and the valve member through the yielding means.

DESCRIPTION OF THE DRAWINGS

In the drawings, which illustrate an embodiment of the invention.

DETAILED DESCRIPTION

Figure 1:
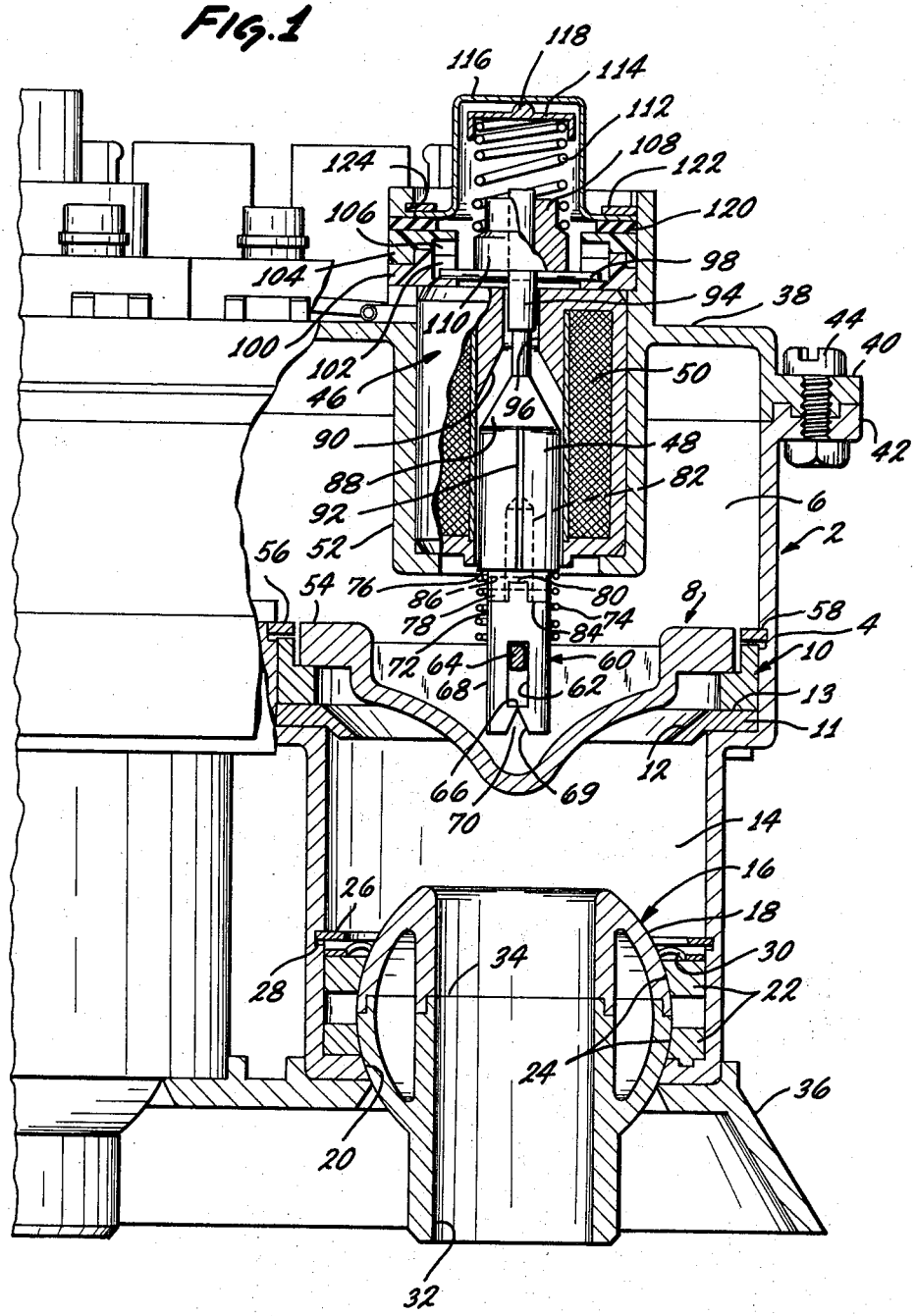
FIG. 1 is a front sectional view of a valve construction in which the valve member is moved axially with respect to a valve seat and supporting ramp and is rotated during its axial movement for positioning at a different level with respect to the valve seat.

As shown in FIG. 1, the valve mechanism, generally indicated as 2, includes an outer shell 4 having an air passage 6 defined therein. Several valve mechanisms 2 may be formed as a single unit with all of the valve mechanisms receiving air from a common air passage 6. However, only one valve mechanism 2 is shown in section view for ease of description.

Positioned within the valve mechanism 2 is a valve member generally designated as 8 which is supported by a circumferential ramp generally designated 10 positioned on an upper surface 13 of a valve seat member 11 that includes a valve seat surface 12. With the valve member 8, thus, held away from the valve seat surface 12, air under pressure is permitted to pass from the air passage 6 into an air passage 14.

A movable nozzle generally designated 16 is in flow communication with the air passage 14 with the nozzle having a spherical outer surface 18 positioned in contact with an arcuate supporting surface 20 defined by the outer shell 4. Support rings 22 are positioned between the spherical surface 18 and the inner wall of the outer shell 4 with the support rings each providing arcuate supporting surfaces 24 in contact with the spherical surface of the nozzle. The nozzle 16 may be held in place through a snap ring 26 which engages a retaining groove 28 in the shell 4 and bears against a spring 30 in contact with one of the support rings 22.

The nozzle 16 includes a central bore 32 and, for ease in assembly, the nozzle may be formed in two parts which are joined in interlocking relations along a contact line 34. As illustrated, the nozzle 16 may be swiveled in any desired direction to direct air onto a passenger seated in an airplane. In more efficiently directing air onto the passenger seated beneath the nozzle 16, an outwardly flared skirt 36 may be provided adjacent the opening of the nozzle.

A top closure member 38 having a flange 40 may be connected to a corresponding flange 42 on the outer shell 4 by a plurality of connectors 44 which pass through threaded openings in the flanges 40 and 42. A solenoid 46 or similar reciprocatory actuating means to impart movement to the valve member 8 is positioned within a receptacle 52 which may be integral with the top closure member 38. The solenoid 46 includes a movable armature 48 and a coil 50 with the armature being connected to the valve member 8 to reciprocate the valve member on actuation of the solenoid.

A plurality of radial follower arms 54 included in the valve member 8 are in contact with the circumferential ramp 10 to position the valve member at a desired level with respect to the valve seat surface 12. This controls the extent of the opening between the air passage 6 and the air passage 14 and the quantity of air discharged through the nozzle 16. The circumferential ramp 10 may be fixedly held against the upper surface 13 of the valve seat member 11 by a snap ring 56 engaged in a retaining groove 58 formed in the outer shell 4.

Movement of the solenoid armature 48 may be conveniently transmitted to the valve member 8 through a plunger generally designated 60. The plunger 60 includes an axial slot 62 with a pin 64 positioned slidably within the slot. The pin 64 is joined to the valve member 8 and transmits movement to the valve member when the pin is raised or lowered into contact with one of the ends of the slot 62.

For ease in assembly, the slot 62 may be sprung apart along a bottom opening 66 for insertion of the pin 64. A pair of side members 68 define the sides of the slot 62 with the lower ends of the side members positioned in abutting relation at the opening 66. A V-slot 70 formed by diagonally positioned surfaces 69 on the side members 68 may be used in guiding the pin 64 into the slot 62. By pressing the V-slot 70 against the upper surface of the pin 64, the side members 68 are sprung apart to permit entry of the pin into the slot 62. However, once the pin 64 is within slot 62, the resiliency of the side members 68 causes them to snap back to their abutting position shown in FIG. 1 to effectively close the bottom of the slot.

The plunger 60 has an outer surface 72 about which is positioned a coil spring 74. The upper end of the coil spring 74 bears against an annular step 76 on the armature 48 while the lower end of the coil spring bears against the upper surface of the pin 64. The armature 48 includes a connecting ring 78 at its lower end having a transverse slot 80 extending through the ring. An axial bore 82 within the body of the armature 48 extends downwardly into the open region bounded by the ring 78. With the plunger 60 connected to the armature 48, a pin on the end of the plunger extends into the axial bore 82 with plunger and armature connected together at the lower edge 84 of the connecting ring 78. A side bore 86, shown in phantom line drawing, extends through the retaining ring 78 and plunger 60 with a pin being inserted into the side bore to secure the plunger to the armature.

The armature 48 includes a tapered exterior surface 88 which moves relative to a tapered interior surface 90 of the solenoid 46. Desirably, moisture is precluded from entering into the region bounded by the surfaces 88 and 90 and appropriate seals may be provided to prevent the entrance of moisture. However, as a precautionary measure, axial grooves 92 may be provided in the outer surface of the armature 48 to permit the flow of moisture and air through the grooves and to prevent the region bounded by the surfaces 88 and 90 from acting as a dash pot during actuation of the armature 48.

A push rod 94 may be formed integrally with the armature 48 with the push rod extending through an aperture 96. A pair of radial arms 98 project outwardly from the push rod 94 with the radial arms being conveniently provided by a pin passing through a side aperture in the push rod. A lower ring 100 positioned about the push rod 94 defines an upwardly directed circular series of ratchet teeth 102 while an upper ring 104 positioned on top of the lower ring provides a downwardly directed circular series of ratchet teeth 106. The teeth 102 are staggered relative to the teeth 106 to provide an annular groove which retains the ends of the radial arms 98.

As will be described, reciprocatory axial movement of the armature 48 causes a corresponding movement of the radial arms 98 in engagement with the ratchet teeth 102 and 106. Due to contact of the radial arms 98 with the ratchet teeth 102 and 106, the armature 48 and valve member 8 undergo stepwise rotational movement during the axial movement of the armature and valve member. This rotational movement provides a repositioning of the valve member 8 with respect to the circumferential ramp 10 which, as will be described, causes a change in the relative position of the valve member 8 and the valve seat surface 12. The extent of the opening between the air passage 6 and the air passage 14 may, thus, be varied so that the quantity of air discharged through the nozzle 16 may be varied to suit the desires of a particular passenger.

A spring support member 108 is connected to the upper end of the push rod 94 by any convenient means such as providing a bore through the support member which engages the push rod. The outer surface of the support member 108 includes a shoulder 110 on which is positioned the lower end of a coil spring 112. The upper end of the spring 112 is enclosed by a spring support ring 114 having a protuberance 118 that bears against the inner surface of a cap 116. The cap 116 is positioned against the upper surface of the ring 104 through a gasket 120 with the cap secured in place through any convenient means such as a snap ring 122 that engages a retaining groove 124.

As illustrated, the valve member 8 is lifted upwardly through movement of the solenoid armature 48 on actuation of the solenoid 46. As the valve member 8 is moved upwardly through contact of the pin 64 with the lower end of the slot 62, the valve member is rotated through contact of the radial arms 98 with the downwardly directed circular series of ratchet teeth 106. During upward movement of the solenoid armature 48, the coil spring 112 is compressed between the support member 108 and the spring support ring 114. When the solenoid armature 48 reaches the upward extent of its movement, the radial arms 98 are in engagement with the root portions of the teeth 106 which, thereby, limit the upward movement of the armature.

During downward movement of the armature 48, the solenoid 46 is de-energized with downward movement being provided by the force of the coil spring 112. During downward movement, the radial arms 98 are brought into engagement with the upwardly directed circular series of ratchet teeth 102 with the arms being cammed against the surfaces of the teeth to cause rotational movement of the armature 48 and valve member 8. When the armature 48 reaches the downward extent of its movement, the radial arms 98 are in engagement with the root portions of the teeth 102, as shown in FIG. 1, which limits the downward movement of the armature.

During downward movement of the armature 48, the radial follower arms 54 of the valve member 8 may be brought into contact with the circumferential ramp 10. When this occurs, the downward axial movement of the valve member 8 ceases. However, downward movement of the armature 48 may continue with relative movement between the armature and valve member 8 being provided by the compression of the coil spring 74 and the movement of the pin 64 relative to the slot 62. Rotation of the valve member 8 may occur while the valve member is in contact with the circumferential ramp 10 due to the continued downward movement of the armature 48 and the radial arms 98 relative to the upwardly directed circular series of ratchet teeth 102. As the valve member 8 rotates, the radial follower arms 54 may undergo sliding movement in contact with the circular ramp 10.

Figure 2:
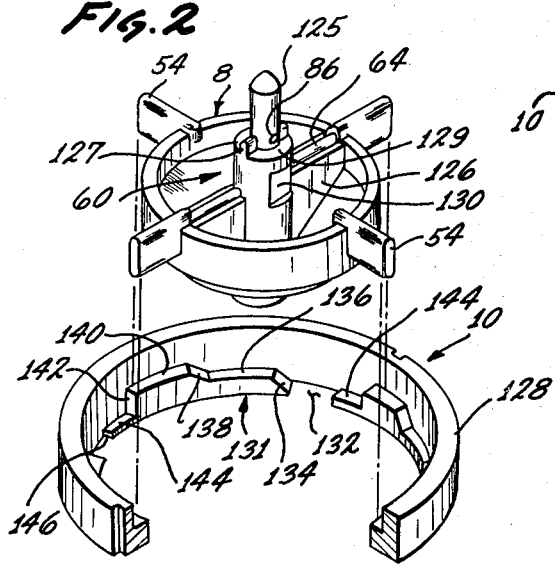
FIG. 2 is an exploded perspective view illustrating the configuration of the valve member and the manner in which it may be positioned at different levels by contact with a ramp surface having stepped portions positioned at different levels with respect to a valve seat.

The manner in which the valve member 8 is positioned by the circumferential ramp 10 is more clearly illustrated in FIG. 2 which shows the valve member and ramp in exploded perspective view. The plunger 60, which is connected to the valve member 8 through pin 64, includes an upwardly projecting pin 125 that is engaged within the axial bore 82 of the solenoid armature 48 (FIG. 1). The plunger 60 also includes wedge portions 127 for engagement with the transverse slot 80 through connecting ring 78 and a transverse surface 129 which engages the lower edge 84 of the connecting ring.

Radially projecting wings 126 extend inwardly from the surface of the valve member 8 with the wings being positioned beneath the pin 64. As illustrated, each of the radially projecting wings 126 terminates at a point adjacent the surface of the plunger 60 to provide space between the wings for movement of the plunger in an axial direction.

Relieved areas 130 are provided on either side of the plunger 60 to reduce the thickness of the side members 68 at the relieved areas. This facilitates bending of the side members 68 as the side members are spread apart during insertion of the pin 64 within the slot 62 (see FIG. 1).

The circumferential ramp 10 includes a cylindrical wall portion 128 within which is defined a stepped ramp surface 131. The stepped ramp surface 131 provides four openings 132, which lead to four inclined surfaces 134 followed by four transverse surfaces 136. Following the four surfaces 136 are four inclined surfaces 138 which lead to four transverse surfaces 140. The four surfaces 140 are followed by four vertical surfaces 142 which lead to four transverse surfaces 144. The four surfaces 144, in turn, lead to four vertical surfaces 146 which lead to the four openings 132.

As described previously, the valve member 8 is rotated during its axial movement which changes the position of the valve member with respect to the circumferential ramp 10. With reference to the particular configuration shown for the valve member 8 and the circumferential ramp 10 illustrated in FIG. 2, the movement of the valve member can be pictured by assuming that the valve member is in its open position shown in FIG. 1 to provide a maximum opening between the air passages 6 and 14. In this position, the radial follower arms 54 rest on the transverse surfaces 140 indicated by the broken projection lines in FIG. 2.

On actuation of the solenoid 46 (FIG. 1), the valve member 8 is lifted upwardly to move the follower arms 54 away from the transverse surfaces 140 while, at the same time, the valve member is rotated slightly in a counterclockwise direction from its position in FIG. 2. Then, on downward movement of the valve member 8, the radial follower arms 54 are brought into contact with the transverse surfaces 144 with the follower arms 54 sliding relative to the surfaces 144 as the valve member undergoes continued counterclockwise rotation until the follower arms are positioned within openings 132. At this point, the follower arms 54 are positioned close to the upper surface 13 of the valve seat member 11 and the valve member 8 contacts the valve seat surface 12 to close the opening between the air passages 6 and 14.

The valve member 8 does not engage the valve seat surface 12 until the follower arms 54 enter the openings 132. Thus, during rotational movement of the valve member 8 prior to contact of the valve member with the valve seat surface 12, the only frictional force resisting rotation of the valve member results from contact of the follower arms 54 with the surfaces 144. The contact area between the follower arms 54 and the surfaces 144 is relatively small and any friction forces opposing rotation of the valve member 8 are, thus, reduced to a minimum.

With the valve member 8 in its lowermost position with follower arms 54 positioned within the openings 132, the next actuation of the solenoid 46 raises the valve member while rotating the valve member stepwise in a counterclockwise direction. On downward movement of the valve member 8, the follower arms 54 contact the transverse surfaces 136 with the follower arms undergoing sliding movement with respect to the surfaces 136 during continued rotation of the valve member 8 in a counterclockwise direction. With the valve member 8 at rest in engagement with the surfaces 136, the valve is in its half-open position and is spaced apart from the valve seat surface 12.

During the next actuation of the solenoid 46, the valve member 8 is again moved upwardly away from the circumferential ramp 10 while undergoing further rotation in a counterclockwise direction. On downward movement of the valve member 8, the follower arms 54 are brought into contact with the transverse surfaces 140 with the follower arms sliding with respect to the surfaces 140 during continued counterclockwise movement of the valve member. With the valve member at rest in contact with the flat surfaces 140, the valve is returned to its full-open position.

In describing the movement of the valve member 8 with respect to the circumferential ramp 10 in FIG. 2, it should be understood that the invention is not limited to the use of four radial follower arms 54 or the use of a circumferential ramp having a ramp surface designed for a three-position valve movement between a closed, half-open and full-open position. If desired, for example, the valve member 8 may be provided with three radial follower amrs with the ramp surface 131 then being modified to provide three or six openings 132, three or six transverse surfaces 136, etc. Also, for example, the ramp surface 131 may be modified to provide for a two-position valve in which the surfaces 136 would be eliminated with the valve member moving directly from a closed to a full-open position.

Also, if desired, the circumferential ramp 10 may be modified to provide for a valve having more than one intermediate position as provided by the transverse surfaces 136. By providing additional surfaces placed at intermediate levels between the openings 132 and the transverse surfaces 140, the valve may have a number of intermediate positions between its fully closed and fully opened position.

Figure 3:
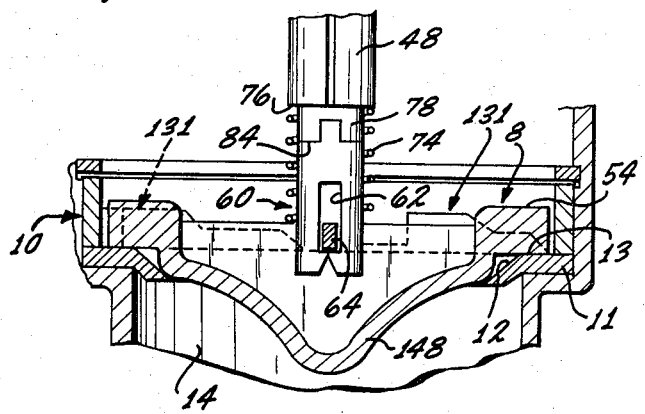
FIG. 3 is a partial front sectional view illustrating the position of the valve member with respect to the ramp when the valve member is in engagement with the valve seat.

FIG. 3, which is a partial front sectional view, illustrates the valve member 8 in its fully closed position in which an exterior surface 148 is in contact with the valve seat surface 12. As described with regard to FIG. 2, the follower arms 54 then rest within the openings 132 and close to the upper face 13. With the valve closed and the valve member 8 at its lowermost position, the pin 64 is positioned very close to the bottom of the slot 62 and the coil spring 74 is at its greatest extension. Due to the close proximity between the pin 64 and the bottom of the slot 62 with the valve member 8 in closed position, the upward movement of the armature 48 is transmitted, almost instantaneously, to the valve member 8.

Figure 4:
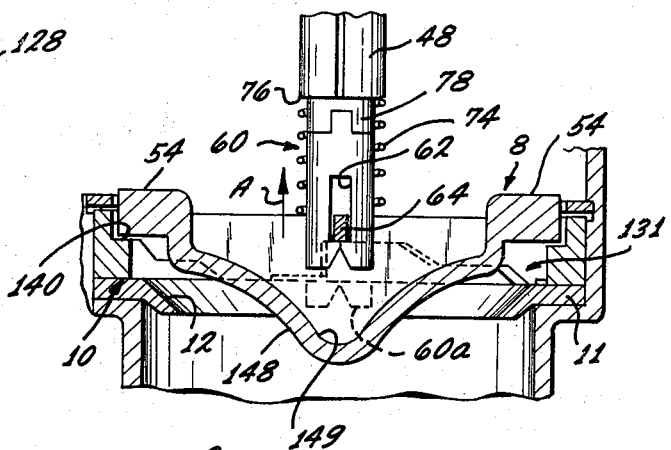
FIG. 4 is a partial front sectional view illustrating the valve member positioned on the ramp in spaced relation to the valve seat at the initiation of upward movement of the valve member through actuation of a reciprocatory member.

FIG. 4, which is a front sectional view similar to FIG. 3, illustrates the position of the valve member 8 in its full-open position with the follower arms 54 resting on the transverse surfaces 140. With the valve member 8 in full-open position, the lower end of the plunger 60 is positioned very close to the interior surface 149 of the valve member as shown in phantom line drawing at 60a. Also, the pin 64 is then positioned closely adjacent to the upper end of the slot 62.

On movement of the plunger 60 in the direction of the arrow A with upward movement of the solenoid armature 48, the valve member 8 does not experience upward movement until the pin 64 reaches the bottom of the slot 62. When this occurs, the valve member 8 is then moved upwardly and rotated, etc., as described, for repositioning the valve member at a new location with respect to the ramp 10 on downward movement of the plunger 60.

Figure 5:
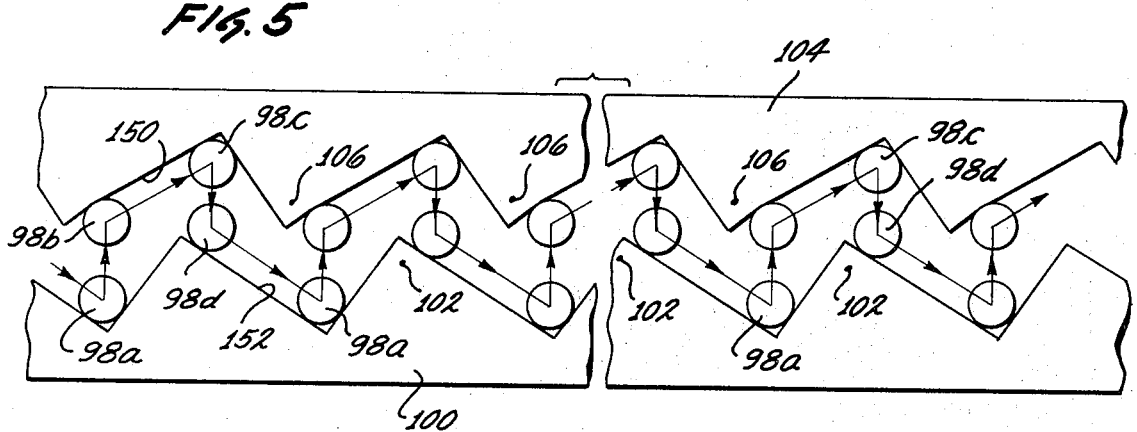
FIG. 5 is an enlarged diagrammatic elevational view showing the manner in which a radial follower associated with the valve member cooperates with a first and second fixed circular series of teeth to provide rotation of the valve member during its axial movement.

FIG. 5 illustrates in enlarged dirgrammatic view the movement of the radial arms 98 between the upwardly directed circular series of ratchet teeth 102 and the downwardly directed circular series of ratchet teeth 106 to provide rotation of the valve member 8. In their lowermost positon, the radial arms 98 are in contact with the roots of the teeth 102 as indicated at 98a. On upward movement of the radial arms 98, the arms move upwardly until contact is made with an inclined surface 150 of the teeth 106 as indicated at 98b. On continued upward movement of the radial arms 98, the arms are cammed against surface 150 which causes rotational movement of the arms to the position indicated at 98c with arms in contact with the roots of the teeth 106. This contact limits the extent of upward movement of the arms 98.

On downward movement of the arms 98, the arms move to the position indicated at 98d where they contact the inclined surface 152 of the teeth 102. On continued downward movement of the arms 98, the arms are cammed against the surface 152 which causes rotational movement of the arms to position 98a with the arms again being in contact with the roots of the teeth 102. Thus, for each reciprocation of the solenoid armature 48 (see FIG. 1), the radial rams 98 undergo clockwise rotational movement from the root of one tooth 102 to the root of the next adjoining tooth 102. This produces stepwise rotation of the radial arms 98 which is, in turn, imparted to the push rod 94, solenoid armature 48, plunger 60, and valve member 8. The stepwise rotation of the valve member 8, as described previously, repositions the valve member with respect to the ramp 10 which changes the position of the valve member with respect to the valve seat surface 12. I claim:

1. A valve construction comprising:
   an axially movable valve member;

a valve seat engageable by the valve member in a closed position;

follower means connected to said valve member;

ramp means positioned to support said valve member in a closed or open position through contact with said follower means;

said ramp means including a ramp surface having stepped portions positioned at different levels to contact said follower means in supporting said valve member at different levels with respect to said valve seat;

first means connected to said valve member through a last motion connections to move said valve member axially with respect to said valve seat; resiliently yieldable means positioned between said first means and said valve member to urge said first means and said valve member apart;

second means to rotate said valve member through an incremental arc as said valve member is moved axially;

said incremental arc corresponding to the distance between said stepped portions of said ramp surface, and said lost motion connection permitting relative movement between said first means and said valve member when said follower means is brought into contact with said stepped portions with the extent of relative movement being dependent on the level of the stepped portion which is contacted by said follower means.

2. The valve construction of claim 1 wherein
said valve member is rotated during axial movement of the valve member away form said ramp means, and said valve member is rotated during axial movement of the valve member toward said ramp means.

3. The valve construction of claim 2 including
reciprocative means connected to the valve member to move the valve member away from the valve seat and ramp means and to then move the valve member toward the valve seat and ramp means.

4. The valve construction of claim 1 wherein said stepped portions are positioned transversely to the axial movement of the valve member.

5. The valve construction of claim 1 including
a guide pin carried by the valve member;
a guide slot in engagement with the guide pin, and
said guide slot being shaped to provide rotational movement of the valve member in response to axial movement of the guide pin with respect to the guide slot.

6. The valve construction of claim 5 including
reciprocative means connected to the valve member to move the valve member axially away from the valve seat and ramp means and to move the valve member axially toward the valve seat and ramp means.

7. The valve construction of claim 1 wherein
said ramp means has an annular configuration, and
said ramp surface extends circumferentially about the axis of the valve member.

8. The valve construction of claim 7 wherein:
said stepped portions of said ramp surface are flat;
said stepped portions being transverse to the axial direction of movement of said valve member;

said valve member being rotated during axial movement of said valve member away from said ramp means, and said valve member being rotated during relative movement of said valve member towards said ramp means, whereby movement of said follower means on a stepped portion is facilitated during rotation of said valve member as said first means moves in the direction of said ramp means with relative movement between said first means and said valve member being permitted through the yielding of said yieldable means.

9. The valve construction of claim 8 including:
reciprocative means connected to said valve member to move said valve member axially away from said valve seat and said ramp means and to move said valve means axially towards said valve seat and said ramp means;

said reciprocative means including a solenoid which is actuatable to move said valve member and said follower means axially away from said ramp means, and yielding return means to move said valve member and said follower means toward said ramp means.

10. A valve construction comprising:
an axially movable valve member;
a valve seat engageable by the valve member in a closed position;
ramp means positioned to support the valve member;
said ramp means including a ramp surface having stepped portions positioned at different levels to support the valve member at different levels with respect to the valve seat;
means to move the valve member axially with respect to the valve seat;
means to rotate the valve member through an incremental arc as the valve member is moved axially with said arc corresponding to the distance between the stepped portions of the ramp surface;
said means to rotate the valve member including a guide pin carried by the valve member, a guide slot in engagement with the guide pin, and said guide slot being shaped to provide rotational movement of the valve member in response to axial movement of the guide pin with respect to the guide slot, and
said guide slot including a first fixed circular series of teeth, a second fixed circular series of teeth positioned coaxially with the first series, said first and second series of teeth being spaced apart axially with the teeth of each series directed toward the teeth of the other series, and the teeth of each series being staggered relative to the teeth of the other series.

11. The valve construction of claim 10 wherein
said guide pin projects radially into the space between the first and second fixed circular series of teeth;
said guide pin camming against the teeth of one of the series of teeth on axial movement of the pin in a first direction to provide rotation of the valve member, and
said guide pin camming against the teeth of the other series of teeth on axial movement of the pin in a direction opposite to the first direction to provide further rotation of the valve member.

* * * * *